United States Patent Office 3,340,091
Patented Sept. 5, 1967

3,340,091
LAMINATE OF A POLYOLEFIN SUBSTRATE AND A SURFACE COATING OF A COPOLYMER OF AN OLEFIN MONOMER AND A POLAR MONOMER
Samuel Zweig, Skokie, Ill., assignor to Morton International, Inc., a corporation of Delaware
No Drawing. Filed Mar. 21, 1966, Ser. No. 535,741
6 Claims. (Cl. 117—138.8)

This application is a continuation-in-part of my earlier application, Ser. No. 202,380, filed June 14, 1962, and now abandoned.

This invention relates to printable thermoplastic films or resins and a method of producing such resins. The invention further relates to the treatment of surfaces of hydrocarbon polymers to render the surfaces printable.

Thermoplastic hydrocarbon polymers are useful in many applications where it would be highly desirable to include printed matter, decorative coloring and clear coatings on the polymer surface. For example, in the use of thermoplastic hydrocarbon polymer films or sheets for packaging, it is desirable to include on the package various printed matter such as trade names, advertising material, recipes, etc. In the plastic object field it is often desirable to color the objects. Although the hydrocarbon polymer films or objects, e.g. polyethylene films, have many desirable properties compatible with packaging use, without further treatment they usually lack adaptability to receive and retain printed or colored matter, e.g. in the form of organic inks. For example, polyethylene films are tough, possess acceptable chemical resistance, are transparent, permit passage of oxygen while being fairly impermeable to moisture vapor, and are heat sealable. Such combination of properties renders polyethylene films highly useful for packaging and wrapping such items as chemicals, textiles, hardware and consumable produce, e.g. fresh vegetables and fruits, meats, dried milk, and the like. However, organic printing inks such as the standard aniline and rotogravure printing inks employed in the printing of our films do not satisfactorily adhere to the surface of the polyethylene film. Further it may be desirable to reduce gas permeability by coating with substantially gas impermeable coatings such as vinylidene chloride.

Generally, the anchorage of printing composition or other coatings on a surface depends upon the type of physical or chemical bond existing between the printing composition and surface. Thus, paper or other porous surfaces provide adequate anchorage of the printing composition by impregnation and infiltration of the composition into the pores of the fibrous structure, enabling a firm gripping relation of the printing composition with the surface, while anchorage of printing compositions to smoother surfaces, such as plastic or glass surfaces, usually depends upon a physical chemical bond which may be obtained by softening the surface with a mutual solvent or providing other techniques for integrating the printing composition with the surface of the material being printed. With a material such as a polyethylene film, the possibilities for anchorage in the usual manner are substantially absent.

Polyethylene films are commonly produced by extruding polyethylene on a fibrous substrate, such as paper, by rotational casting, or extruding a film of polyethylene on a belt from which it is removable as a polyethylene film. Difficulties in printing or coating on polyethylene surfaces are believed to arise from the smoothness of the surface and the inertness of the resinous polymer. The smoothness of the surface decreases the possibility of physical anchorage and the inertness of the resin decreases the possibility of obtaining a bond with the coating composition by such techniques as employ mutual solvents or chemical bonding.

Various proposals have been made for rendering polyethylene and like hydrocarbon polymers printable. Such proposals involve pretreatment or oxidation of the polymer surface, such as by the differential heat treatment method of W. H. Kreidl, disclosed in U.S. Patent 2,632,921, patented Mar. 31, 1953; the flame searing technique of M. F. Kritchener, disclosed in U.S. Patent 2,683,894, patented July 20, 1954; a technique involving action of high voltage electric stress accompanied by corona discharge as disclosed by R. F. Pearce et al. in U.S. Patent 2,810,933, patented Oct. 29, 1957; and/or treatment with electric glow discharge at elevated temperature as disclosed by G. H. Berthold et al. in U. S. Patent 2,859,480, patented Nov. 11, 1958. These testing procedures are generally acceptable in use with flat films; however, with extremely thin films or irregular objects, difficulties such as pinholding, non-uniform treating, and temporary print loss of printability on aging have often been experienced.

An object of this invention is to provide new and useful hydrocarbon polymers having printable surfaces and further to provide a method for obtaining such new and useful products which avoids the pretreatment procedures and the problems mentioned above.

Another object of this invention is to provide a normally solid thermoplastic hydrocarbon polymer having an unoxidized surface and a normally solid thermoplastic polar polymer coating fused directly to the untreated surface, thereby rendering the surface of the hydrocarbon polymer printable.

A more specific object is to provide such a coated unoxidized hydrocarbon polymer in which the polar polymer is a copolymer of a hydrocarbon monomer and a polar monomer and contains a sufficient proportion of hydrocarbon units to anchor the coating to the hydrocarbon polymer by fusion and also contains a sufficient proportion of polar units to render the coating printable.

A further object of this invention is to provide a normally solid unoxidized thermoplastic polyethylene film, sheet or object rendered printable by fusing thereon a copolymer coating having ethylene as one of the monomeric units and having a monoethylenically unsaturated polar compound as another monomeric unit.

A still further object is to provide a method of forming the article of any of the foregoing objects by fusion coating the polar polymer to the unoxidized surface.

Another object is to provide a polyethylene based film material according to any of the foregoing objects which may advantageously be used in packaging applications to provide a package having a printable exterior.

Other objects and advantages of the invention will become apparent from the following description.

Throughout this specification the word printable shall include printing, painting, and coating.

The present invention provides an article composed of normally solid thermoplastic hydrocarbon polymer having an untreated or unoxidized surface and a normally solid thermoplastic polar polymer coating fused on the unoxidized surface. The unoxidized surface is a surface which has not been treated for the purpose of oxidizing the surface, although it is intended that the surface can be one which is oxidized to a slight extent as may normally occur by ordinary exposure of the surface to air at ambient conditions or through other procedures not intended or effective for oxidizing the surface to an extent rendering it receptive to printing. The polar polymer of the coating is a copolymer, including tripolymers, interpolymers, graft polymers and the like, of a hydrocarbon monomer and a monomer having polar groups such as carbonyl, carboxy, hydroxy, or amino groups or mixtures of such polar groups. Advantageously it may be a copolymer, of a monoethylenically unsaturated hydrocarbon monomer, preferably ethylene, and a monoethylenically unsaturated polar monomer. Monoethylenic unsaturation as used herein is polymerizable open chain mono-olefinic unsaturation. The coated hydrocarbon polymer article can be made by heat fusing the hydrocarbon polymer surface to a sufficiently soft state to receive the polar polymer coating in fusion therewith, e.g. at a temperature in the softening temperature range of the hydrocarbon polymer.

Although this invention is particularly described with respect to the use of polyethylene as the hydrocarbon polymer herein, it is intended and it is to be understood that any normally solid thermoplastic high molecular weight hydrocarbon polymer, i.e., homopolymer or copolymer, etc., is usable in accordance herewith. The hydrocarbon polymer should not normally be so soft that the copolymer coating can readily be scraped therefrom. Preferably the hydrocarbon polymer has its softening temperature above about 180° F. The preparations of such hydrocarbon polymers, usually entailing the homopolymerization or copolymerization of one or more hydrocarbon monomers in the presence of a catalyst under known temperature conditions, are well known in the art. The usable hydrocarbon polymers are polymers of low molecular weight ethylenically unsaturated hydrocarbons and include, but are not restricted to, polyethylene, polypropylene, polybutylene, polyisobutylene, the polyhexenes, and copolymers such as copolymers of butylene and isobutylene, butylene and styrene, ethylene and butylene, ethylene and propylene, styrene and ethylene, butylene and propylene, and the like. The preferred hydrocarbon polymers are polyethylene and polypropylene.

The polar polymer coatings in accordance herewith are normally solid high molecular weight thermoplastic polar copolymers of low molecular weight polar monomers and low molecular weight hydrocarbon monomers such as monoethylenically unsaturated hydrocarbon monomers. Such polar monomers include, but are not limited to, the following: ester monomers such as vinyl acetate, esters of acrylic, methacrylic, ethacrylic, etc., acids (e.g., the methyl, ethyl, butyl, cyclohexyl, benzyl, phenyl, etc. esters), and alcohols such as methyl, allyl, butyl, methylol cyclohexane, glycol, polyethylene glycol, trimethylol propane, etc., and esters of unsaturated alcohols such as monoallyl phthalate and terephthalate, allyl adipate, allyl-2-ethylhexanoate, and the like; unsaturated ethers such as vinyl isobutyl ether, vinyl 2-ethylhexyl ether, allyl n-butyl ether, and the like; unsaturated alcohols such as allyl alcohol, methallyl alcohol, octenyl alcohol, and the like; unsaturated acids or anhydrides such as maleic anhydride, fumaric anhydride, methacrylic acid, ethacrylic acid, phenacrylic acid, maleic anhydride, acrylic acid, crotonic acid, and the like, and their esters with saturated and unsaturated alcohols such as the allyl alcohols; basic nitrogen-containing monomers such as vinylpyridine and low alkyl derivatives thereof, allyl melamine, allylamine, and the like; ketones and aldehydes such as isopropenylacetoacetate, methyl vinyl ketone, methyl isopropenyl ketone, p-acetylstyrene, and the like. Copolymers, etc., of such monomers are also intended.

Alternatively, the polar polymer may be a copolymer of a hydrocarbon monomer and a condensation polymer or prepolymer such as a polyester, e.g. polyethylene terephthalate, alkyd resin, condensation polymers such as the polyester of hexamethylene and glycol and adipic acid, and generally polyesters of polybasic acids, e.g. succinic, maleic, tartaric, citric, adipic, pimelic and terephthalic acids, with polyhydric alcohols, e.g. ethylene glycol, glycerol, propylene glycol, butane-2,3-diol, sorbitol, pentaerythritol, etc.

The copolymer is preferably a high molecular weight copolymer of the polar monomer and a monoethylenically unsaturated hydrocarbon monomer such as ethylene, propylene, butylene, isobutylene, and the like. Such copolymers include, for example, copolymers of ethylene and ethyl acrylate or ethylene and maleic anhydride as well as copolymers of ethylene and vinyl acetate such as marketed under the trade name "Elvax," e.g. "Elvax" 150, 240 and 250, having a comonomer ratio, ethylene:vinyl acetate, of 67:33 wt. percent to 72:28 wt. percent and a softening point, ring and ball, of 243 to 276° F. Of course, it is apparent that other polymers containing polar units may be used in accordance herewith. The copolymer should contain a sufficient number of polar units to render the copolymer coating printable and a sufficient proportion, preferably a major proportion, of hydrocarbon monomer units to render the copolymer fusible with the hydrocarbon polymer.

Advantageously, such inks as flexographic inks, e.g. the aniline and rotogravure inks, adhere to the coated surface of articles of this invention and can be used in printing the coated surface. Other organic inks may also be useful in such printing. Although I do not intend to be held to any theories regarding the operation of my process for forming new and useful articles in accordance herewith, it is believed that the polar group or units of the coating, being more solvent, provide adherence of the organic inks to the suface, rendering the polyethylene surface improved in printabilities.

In general with respect to the method of preparing coated articles in accordance herewith, the surface of a thermoplastic hydrocarbon polymer object is heated to render its surface heat-fusible with the polar polymer coating. The coating material is fused with the heated surface.

The application of the polar polymer material to the surface may be effected by any means desired. For example, a film of the polar polymer coating material, formed by extrusion in the usual manner, can be applied to the hot surface of the hydrocarbon polymer and fused thereto. Pressure, e.g. by chill rollers, may be applied if desired. Alternatively, a solution or a dispersion of polar polymer may be used to deposit the polar polymer on the hot softened surface of the hydrocarbon polymer, the polar polymer becoming fused to the surface. The heating of the hydrocarbon polymer surface is at a temperature in its softening range, i.e. sufficient to cause softening of the polymer surface but not in excess of temperatures compatible with the stability of the hydrocarbon polymer. Thus, temperatures which are sufficiently high to destroy the polymer or render it useless for its intended purpose should not be used. For example, the temperature is preferable at least about 180° F. The heating time is that required to soften the polymer at the temperature used to provide adhering properties for the polymer at the surface.

Hydrocarbon polymer films which are coatable in accordance herewith can be prepared by any one of a variety of processes known to the art. The films can be extruded on a belt and removed therefrom or can be extruded on and fused with a porous substrate such as paper, to produce a film adhering to the substrate. Such films can be coated in accordance herewith immediately after their extrusion. For example, a solution or a dispersion of polar polymer is placed on a non-adhering transfer base such as a belt or roller, the solvent is evaporated and the polar polymer on the belt or roller is brought to surface contact with the extruded film at elevated temperature, e.g. the temperature of the extruded film. The resulting fused surface is then cooled to below its softening temperature, e.g. by passing the coated film through chill rollers.

Alternatively, where the hydrocarbon polymer is extruded as a free film, the coated article can be prepared by coating a belt or roller with the polar polymer in the aforesaid manner and extruding the hydrocarbon polymer onto the coating on the belt or roller, passing the extruded polymer and the polar polymer coating material through a pair of chiller rollers, and thereafter removing the extruded polymer from the belt with the coating fused to the polymer surface.

Hydrocarbon polymer films are also produced by rotational casting methods. The coating method of this invention can advantageously be combined with such casting. Accordingly, the interior of the rotational casting mold is coated with a solution of the polar polymer, the solvent is evaporated and a hydrocarbon polymer is introduced into the mold and rotationally cast. Rotational casting in such a manner produces a film having the coating thereon fused with the hot surface of the hydrocarbon polymer film at the internal surface of the rotational mold. For certain rotational molds it may be desirable or necessary to coat the mold with a release coating composition prior to coating with the polar polymer.

Thus, it is seen that the coating can be fused to the surface of the hydrocarbon polymer in a large variety of embodiments. The methods disclosed above include the deposition of the polar polymer by use of solvents, such as aromatic hydrocarbons (e.g. toluene and benzene), such halogenated hydrocarbons as trichloroethylene and perchloroethylene, tetrahydrofuran, ketones, mixtures thereof, and the like. Solvents for respective polar polymers are well known to those in the art. Further, dispersion in water may also be used. There appears to be no limitation on the concentration of solution or dispersion of the polar polymer in the solvent.

The following examples are offered as an illustration of the present invention and are not intended to be limiting thereon.

*Example I*

A 10% solution of a copolymer of ethylene and vinyl acetate (Elvax 250) in toluene was prepared. The copolymer had an inherent viscosity at 30° C. (0.25% by weight in toluene) of 0.85, a weight ratio of ethylene to vinyl acetate of 72:28, a melt index (ASTM Method D-1238-57T) of 15, a tensile strength of 2000 p.s.i., a density at 30° C. of 0.95 B. cc., a refractive index ($n$ 25/D) of 1.482 and a softening point by the ring and ball method of 276° F. The solution was deposited on a fluorocarbon film (Aclar) and the toluene solvent was permitted to evaporate. The copolymer on the fluorocarbon film was pressed against the surface of an unoxidized polyethylene film which had been heated to 300° F. The resulting assembly of films was permitted to cool below softening temperature of the polyethylene and the fluorocarbon film was then removed leaving a polyethylene film having a coating of the copolymer fused to the surface thereof. Testing of the coated film revealed its excellent printability in that it was capable of receiving a flexographic ink which adhered thereto.

*Example II*

A 10% solution of a copolymer of ethylene and ethyl acrylate in toluene was prepared. The copolymer had the following properties:

| | |
|---|---|
| Melt index | 18 |
| Density | 0.927 |
| Tensile strength, ultimate p.s.i | 1200 |
| Tensile strength, yield, p.s.i | 450 |
| Elongation, percent | 700 |
| Stiffness, p.s.i | 6200 |
| Vicat softening point, ° C | 53 |
| Low temperature brittleness, ° C | −70 |

The solution was sprayed to cover one-half of one side of a sheet of untreated polyethylene. The solvent was then evaporated in a hot air oven at about 350° F. The polyethylene sheet was further heated at about 350° F. until the surface began to soften as indicated by a change in surface appearance. The sheet was then cooled and printed with flexigraphic ink on the sprayed side of the sheet. The adhesion of the ink to the coated portion of the surface was superior compared with the non-coated portion.

*Example III*

A two piece aluminum rotation mold (coated with polytetrafluoroethylene for release) was sprayed with a water dispersion of a copolymer of ethylene and maleic anhydride having the following properties:

| | |
|---|---|
| Density | 0.965 |
| Softening point, ° C | 130 |
| Viscosity, cps. at 140° C | 500 |
| Viscosity, cps. at 160° C | 350 |
| Color (liquid) Gardner No | 1 |
| Penetration hardness: | |
|    At 100 g./5 sec./77° F., mm.×10$^{-1}$ (Std. test) | 0 |
|    At 750 g./5 sec./77° F., mm.×10$^{-1}$ | 0–1 |
| Cloud point in Atlantic wax #171: | |
|    At 2% concentration ° F | 214 |
|    At 5% concentration ° F | 219 |
| Acid number | 18–22 |

Thereafter, the water was evaporated leaving a thin film of copolymer as a coating (over the polytetrafluoroethylene coating) on the inside of the mold. Powdered solid unoxidized polyethylene was placed in the coated mold cavity and an object was rotationally cast in an oven maintained above the polyethylene melting point. The mold was cooled and opened and the object removed from the mold had a coating of the copolymer fused to its outer surface. The object was then painted with a pigmented polyamid resin base paint. The adhesion of the paint to the surface was superior to the adhesion to the surface of an object formed in the same manner without the copolymer of ethylene and maleic anhydride.

*Example IV*

A 10% solution of a copolymer of ethylene and vinyl acetate (Elvax 250) in toluene was prepared. The solution was sprayed to coat one-half of one side of a sheet of untreated polyethylene. The sheet was further processed as in Example II and it was found that the coated portion of the cooled sheet was satisfactorily printable while the uncoated portion was practically incapable of receiving flexographic ink.

It is apparent from the foregoing that I have provided new and useful coated polymers and a method for preparing the same. The polar coatings are applied and fused to the hydrocarbon polymer surface of an article without prior treatment of the surface and without requiring special oxidizing extrusion procedures in forming the article from the polymer. The present invention is applicable in rendering printable any such surfaces whether formed under ordinary extrusion conditions or by other normal molding or casting procedures. Although I have disclosed my invention with respect to specific examples and embodiments, adaptations of this invention will be apparent to those skilled in the art and are fully within its scope.

All percentages given herein are percentages by weight unless otherwise indicated.

I claim:
1. As an article of manufacture, a laminate structure comprising a substrate having a surface consisting essentially of unoxidized, normally unprintable, solid thermoplastic polyolefin and a coating heat-fused directly on said unoxidized surface at a temperature above the softening temperature of the polyolefin surface, said coating consisting essentially of a non-tacky, normally solid, thermoplastic polar copolymer of an olefin monomer and a polar monomer and containing a significant proportion of polymerized polar monomer units sufficient to render the coating more polar and more receptive to an organic ink than said surface of said substrate, said olefin monomer being present in an amount sufficient to anchor said coating by heat-fusion to said surface and providing an olefin:polar monomer ratio of from about 67:33 to about 72:28.

2. The article of claim 1 wherein said polar monomer includes polar groups selected from the class consisting of carbonyl, carboxy, hydroxy and amino groups.

3. The article of claim 1 wherein said polar monomer is selected from the group consisting of ethylenically unsaturated esters of carboxylic acids, ethylenically unsaturated ethers, ethylenically unsaturated alcohols, ethylenically unsaturated acids and anhydrides, ethylenically unsaturated nitrogen-containing monomers, ethylenically unsaturated ketones, ethylenically unsaturated aldehydes, and mixtures of the foregoing monomers.

4. The article of claim 1 wherein the olefin monomeric units of said copolymer of said coating are the same as the monomeric units of said polyolefin surface of the substrate.

5. The article of claim 4 wherein said substrate has a surface selected from the class consisting of unoxidized polyethylene and polypropylene.

6. The article of claim 5 wherein the polar monomer of said coating is selected from the class consisting of vinyl acetate, ethyl acrylate and maleic anhydride.

References Cited

UNITED STATES PATENTS

| | | | |
|---|---|---|---|
| 2,434,541 | 1/1948 | Bierer | 18—57 |
| 2,485,248 | 10/1949 | Watson et al. | 117—122 |
| 2,579,138 | 12/1951 | Burness et al. | 18—57 |
| 2,811,475 | 10/1957 | Edge | 154—46.8 |
| 2,815,308 | 12/1957 | Robinson et al. | 264—265 X |
| 2,928,756 | 3/1960 | Campbell | 117—47 |
| 2,991,208 | 7/1961 | Stieger | 154—46 |
| 3,018,195 | 1/1962 | Kelly et al. | 117—138.8 |
| 3,055,784 | 9/1962 | Roedel | 154—50 |
| 3,075,868 | 1/1963 | Long | 156—82 |
| 3,076,720 | 2/1963 | Rice et al. | 117—15 |
| 3,083,684 | 4/1963 | Carlson | 118—246 |
| 3,088,844 | 5/1963 | Hungerford et al. | 117—47 |
| 3,132,047 | 5/1964 | Van Dorn | 118—65 |
| 3,222,191 | 12/1965 | Steiner et al. | 99—174 |
| 3,232,789 | 2/1966 | Pelzek et al. | 117—138.8 |
| 3,239,370 | 3/1966 | Thomson et al. | 117—138.8 |

WILLIAM D. MARTIN, *Primary Examiner.*

MURRAY KATZ, *Examiner.*

W. D. HERRICK, *Assistant Examiner.*